US011442701B2

(12) United States Patent
Dhillon et al.

(10) Patent No.: US 11,442,701 B2
(45) Date of Patent: Sep. 13, 2022

(54) FILTERING SECURITY CONTROLS

(71) Applicant: EMC IP Holding Company LLC, Hopkinton, CT (US)

(72) Inventors: Danny V. Dhillon, Bothell, WA (US); Greg W. Lazar, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/800,581

(22) Filed: Feb. 25, 2020

(65) Prior Publication Data

US 2021/0263710 A1    Aug. 26, 2021

(51) Int. Cl.
| | |
|---|---|
| *G06F 8/20* | (2018.01) |
| *G06F 8/10* | (2018.01) |
| *G06F 8/75* | (2018.01) |
| *G06Q 10/06* | (2012.01) |
| *G06F 21/57* | (2013.01) |

(52) U.S. Cl.
CPC .............. *G06F 8/20* (2013.01); *G06F 8/10* (2013.01); *G06F 8/75* (2013.01); *G06F 21/577* (2013.01); *G06Q 10/06315* (2013.01)

(58) Field of Classification Search
None
See application file for complete search history.

(56) References Cited

U.S. PATENT DOCUMENTS

| | | | | |
|---|---|---|---|---|
| 7,139,999 | B2* | 11/2006 | Bowman-Amuah | G06Q 10/06 717/100 |
| 9,195,573 | B1* | 11/2015 | Giammaria | G06F 11/3688 |
| 9,652,618 | B1* | 5/2017 | Lerner | G06F 21/577 |
| 9,996,064 | B1* | 6/2018 | Finegan | G06Q 10/0639 |
| 10,282,550 | B1* | 5/2019 | Sheridan | G06F 21/577 |
| 2007/0156727 | A1* | 7/2007 | Lim | G06F 11/3438 |
| 2007/0157174 | A1* | 7/2007 | Gebhardt | G06F 11/3624 717/124 |
| 2009/0265209 | A1* | 10/2009 | Swaminathan | G06Q 10/06393 705/7.13 |
| 2013/0104236 | A1 | 4/2013 | Ray et al. | |

(Continued)

OTHER PUBLICATIONS

K. Rindell and J. Holvitie, "Security Risk Assessment and Management as Technical Debt," 2019 International Conference on Cyber Security and Protection of Digital Services (Cyber Security), Oxford, United Kingdom, 2019, pp. 1-8, doi: 10.1109/CyberSecPODS.2019.8885100. (Year: 2019).*

(Continued)

*Primary Examiner* — Andrew M. Lyons
(74) *Attorney, Agent, or Firm* — Ryan, Mason & Lewis, LLP

(57) ABSTRACT

Methods, apparatus, and processor-readable storage media for filtering security controls are provided herein. An example computer-implemented method includes obtaining information pertaining to a software project and a target market of the software project; and identifying, based on the obtained information, at least one security control to be implemented in the software project, from among a plurality of security controls, in order to satisfy at least a threshold level of security defined for the software project, wherein the threshold level of security is based at least in part on one or more security standards related to the target market.

20 Claims, 6 Drawing Sheets

(56) References Cited

U.S. PATENT DOCUMENTS

| | | | | |
|---|---|---|---|---|
| 2013/0167109 | A1* | 6/2013 | Nucci | G06F 9/44 |
| | | | | 717/105 |
| 2015/0040231 | A1 | 2/2015 | Oliphant et al. | |
| 2015/0269383 | A1 | 9/2015 | Lang et al. | |
| 2016/0044057 | A1 | 2/2016 | Chenette et al. | |
| 2016/0182559 | A1 | 6/2016 | Francy et al. | |
| 2017/0244748 | A1 | 8/2017 | Krause et al. | |
| 2017/0330115 | A1* | 11/2017 | Hankins | G06F 8/71 |
| 2018/0146004 | A1 | 5/2018 | Belfiore et al. | |
| 2019/0205542 | A1* | 7/2019 | Kao | G06Q 10/0635 |
| 2019/0354690 | A1* | 11/2019 | Brigandi | H04W 12/126 |
| 2020/0073782 | A1* | 3/2020 | Phoenix | G06F 11/3604 |
| 2020/0159525 | A1* | 5/2020 | Bhalla | G06N 5/02 |
| 2020/0250316 | A1* | 8/2020 | Rickerd | G06F 21/577 |
| 2020/0267186 | A1 | 8/2020 | Tarameshloo et al. | |
| 2020/0278471 | A1* | 9/2020 | Dixon | G01V 3/36 |
| 2020/0364343 | A1* | 11/2020 | Atighetchi | G06F 8/427 |
| 2021/0264031 | A1* | 8/2021 | Dhillon | G06F 21/572 |

OTHER PUBLICATIONS

G. R. Haron and Ng Kang Siong, "Extrapolating security requirements to an established software process: Version 1.0," 2011 International Conference for Internet Technology and Secured Transactions, 2011, pp. 752-757. (Year: 2011).*

K. Rindell and J. Holvitie, "Security Risk Assessment and Management as Technical Debt," 2019 International Conference on Cyber Security and Protection of Digital Services (Cyber Security), Oct. 31, 2019, pp. 1-8, doi: 10.1109/CyberSecPODS.2019.8885100. (Year: 2019).*

Fundamental Practices for Secure Software Development, Mar. 2018, Third Edition, SAFECode (38 pages).

Dhillon, D., Developer-Driven Threat Modeling: Lessons Learned in the Trenches, IEEE Security & Privacy, May 12, 2011, pp. 41-47, vol. 9—Issue 4.

Information technology—Security techniques—Application security—Part 1: Overview and concepts, ISO/IEC FDIS 27034-1:2011(E), 2011.

Dhillon, D., U.S. Appl. No. 16/530,437, filed Aug. 2, 2019.

* cited by examiner

1. Is your offer a product or service that is sold to customers?
   ⦿ Yes  ◯ No

2. Does the offer include new interfaces, features or functionality or introduces or modifies security controls or changes data flows?
   ⦿ Yes  ◯ No 3. Does the offer provide a web interface?
   ⦿ Yes  ◯ No 4. Does the offer expose network ports?
   ⦿ Yes  ◯ No 5. Does the offer make use of any cryptography?
   ⦿ Yes  ◯ No 6. Does the offer rely on certificates for authentication?
   ⦿ Yes  ◯ No 7. Does the offer make use of passwords or encryption keys?
   ⦿ Yes  ◯ No

FILTERING SECURITY CONTROLS

FIELD

The field relates generally to information processing systems, and more particularly to techniques for providing security in such systems.

BACKGROUND

There is a growing number of security and privacy standards. Some aspects of these standards include significant overlap, while other aspects are relevant to particular technology and/or market contexts. It is often difficult to determine which security standards are applicable to a given software project. For new software projects, accounting for all of the security requirements upfront can hinder an ability of a development team to rapidly deliver software (often referred to as "analysis paralysis"). Additionally, security requirements are often deferred due to the cost and complexity involved with implementing them, and thus security becomes an afterthought rather than built into the software at the outset.

A need exists for improved techniques to tailor security controls for a given software product based on relevant characteristics associated with the given software product.

SUMMARY

Illustrative embodiments of the disclosure provide techniques for filtering security controls. An exemplary method includes obtaining information pertaining to a software project and a target market of the software project; and identifying, based on the obtained information, at least one security control to be implemented in the software project, from among a plurality of security controls, in order to satisfy at least a threshold level of security defined for the software project, wherein the threshold level of security is based at least in part on one or more security standards related to the target market.

Illustrative embodiments can provide significant advantages relative to conventional techniques for implementing security controls. For example, challenges associated with identifying and implementing the proper security requirements for a given software product are overcome by, for example, mapping security requirements to normalized security controls and filtering the normalized security controls based on relevant characteristics associated with the given software product (such as, for example, a target market and possibly one or more additional characteristics, such as an assurance level needed). This allows, for example, security controls to be more efficiently identified, implemented, and verified given the current parameters of the software development project, thereby improving the overall security of the system.

These and other illustrative embodiments described herein include, without limitation, methods, apparatus, systems, and computer program products comprising processor-readable storage media.

BRIEF DESCRIPTION OF THE DRAWINGS

FIG. 2 shows a non-limiting example of input for filtering security controls in accordance with an illustrative embodiment

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
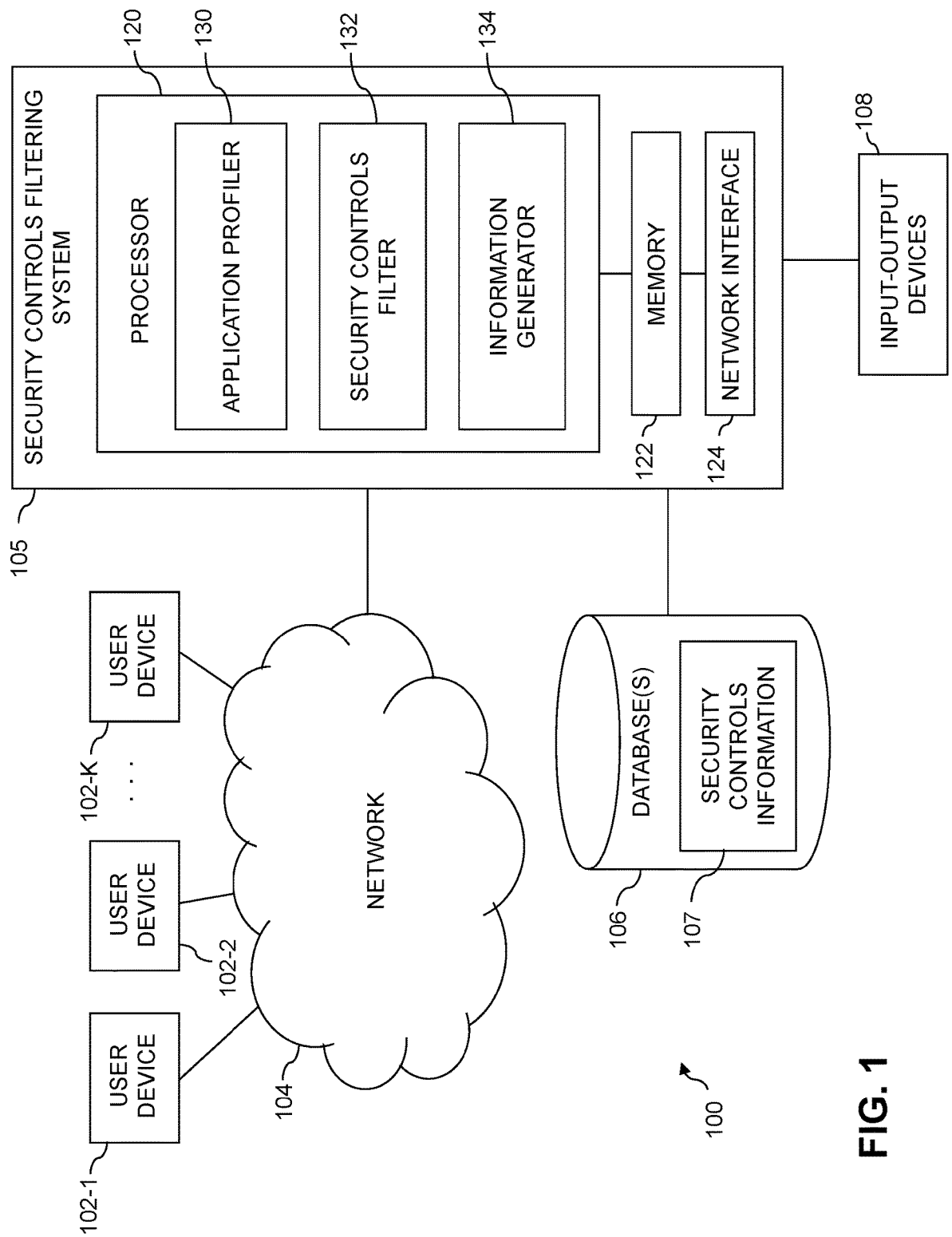
FIG. 1 shows an information processing system configured for filtering security controls in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a security controls filtering system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." The user devices 102 may include any suitable means for performing Human Computer Interaction.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, an ad hoc network, a point-to-point (P2P) protocol network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the security controls filtering system 105 can have an associated database 106 configured to store data 107 pertaining to security controls, which comprise, for example, applicability criteria, verification methods, and/or guidance related to the security controls (such as, for example, code snippets and/or libraries).

The database 106 in the present embodiment is implemented using one or more storage systems associated with the security controls filtering system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the security controls filtering system 105 are input-output devices 108, which illustratively comprise keyboards, displays or other types of input-output devices in any combination. Such input-output devices can be used, for example, to support one or more user interfaces to the security controls filtering system 105, as well as to support communication between user devices 102, the security controls filtering system 105, and other related systems and devices not explicitly shown.

The security controls filtering system 105 in the FIG. 1 embodiment is assumed to be implemented using at least one processing device. Each such processing device generally comprises at least one processor and an associated memory, and implements one or more functional modules for controlling certain features of the security controls filtering system 105.

More particularly, the security controls filtering system 105 in this embodiment can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the security controls filtering system 105 to communicate over the network 104 with the user devices 102, and illustratively comprises one or more conventional transceivers.

The processor 120 further comprises an application profiler 130, a security controls filter 132, and an information generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the application profiler 130, the security controls filter 132, and the information generator 134 may be implemented at least in part in the form of software that is stored in memory 122 and executed by processor 120.

It is to be understood that the particular set of elements shown in FIG. 1 for automated threat analysis of a system design involving security controls filtering system 105 and user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing an application profiler 130, a security controls filter 132, and an information generator 134 of the security controls filtering system 105 in computer network 100 will be described in more detail with reference to the flow diagram of FIG. 4.

As noted herein, there is a plethora of security and privacy standards (such as, for example, ISO 27002 (IT Security), 27040 (Storage Security), Payment Card Industry (PCI), OWASP (Open Web Application Security Project) Top 10, SANS Top 25, HIPPA (Health Insurance Portability and Accountability Act), SOX (Sarbanes-Oxley Act), FIPS (Federal Information Processing Standards), and NIST (National Institute of Standards and Technology) 800 series). Understanding which standards to apply to a given product can be a time-consuming analysis process. Some of the requirements have been captured in FTC (Federal Trade Commission) case studies where vendors have been fined for not meeting basic security requirements.

The security requirements are so numerous and complex that a manual analysis by a subject matter expert is often needed to identify tradeoffs (such as, for example, between implementing core functionality and implementing security controls) in order to determine a minimum viable product. By way of example, it is often not wise to implement advanced security functionality at the cost of core functionality for new products (such as an initial version of a software product). In such situations, the core functionality typically needs to be released and refined as soon as possible, otherwise the product is unlikely to succeed. On the other hand, a mature product that is sold into a regulated environment (e.g., PCI) will face stringent control objectives that must be implemented to be considered during the purchase process.

At least one embodiment of the disclosure includes tailoring security controls based on a target market and an assurance level for a piece of software to help address the numerous definitions of security. Some example embodiments include obtaining characteristics of a piece of software and identifying security controls that are needed to secure the software based on the target market and possibly one or more additional characteristics, such as an assurance level. It is noted that the term "security control" as used herein is intended to be broadly construed so as to encompass, for example, any mechanism that mitigates against a threat.

According to some example embodiments, a security control catalog is used to map various different standards to normalized security controls. By way of example, the mapping in the security control catalog may be defined manually (e.g., an expert manually reviewing different standards and mapping sections of the standards to the normalized security controls), in an automated manner (e.g., a software script that crawls text of various standards to identify overlapping sections), in a semi-automated manner (e.g., using a software script to identify overlapping sections along with user verification of the identified sections), or a combination thereof. This mapping allows overlapping requirements to be removed, thus providing a single set of requirements for product developers to reference. For each security control, an applicability criterion is maintained. The applicability criterion may be a Boolean logic of: (1) the technological characteristics of the software that trigger the security control, and (2) the market and/or regulatory context in which the security control is required. As an example, a security control related to network filtering is only applicable to software that communicates over a network. As another example, cryptography controls may be different for different countries. Each security control is a verifiable requirement, wherein the level of verification performed specifies the assurance level. For example, a security control may be verified through self-attestation by a developer (which is low cost but also low assurance) or through independent whitebox verification by an expert (which is higher cost but also higher assurance). With such a structure, a user (e.g., a product manager, architect or developer) may determine the security controls necessary for a given piece of software by providing characteristics on the target market and/or technological characteristics of a piece of software.

Referring now to FIG. 2, this figure shows a non-limiting example of input that can be used for filtering security controls in accordance with an illustrative embodiment. In this example, the input is in the form of user input provided in response to a questionnaire output to a user interface 200. It is noted that the questionnaire shown in FIG. 2 is not intended to be limiting, and other formats are also possible (e.g., multiple choice format, all text format, etc.). Additionally, it is to be appreciated that the specific questions shown in FIG. 2 are merely examples, and that characteristics associated with the application may be obtained in different ways such as using a different set of questions (for example, fewer questions, more questions, or different questions).

In case of input provided in the form depicted in FIG. 2, a list of the necessary controls and verifications along with implementation and verification effort estimates may be generated. The user can then filter the security controls list by specifying a target market (if one is not already specified) and an assurance level to compare and determine the proper security scope given, for example, resource availability. According to some example embodiments, a target market may be implied and/or determined based on the software code itself. As an example, if software includes portions of code related to processing credit card payments, then a PCI target market may be identified based on those portions. The user may then change the target market if it is inaccurate, or add additional target markets, for example.

Figure 3:
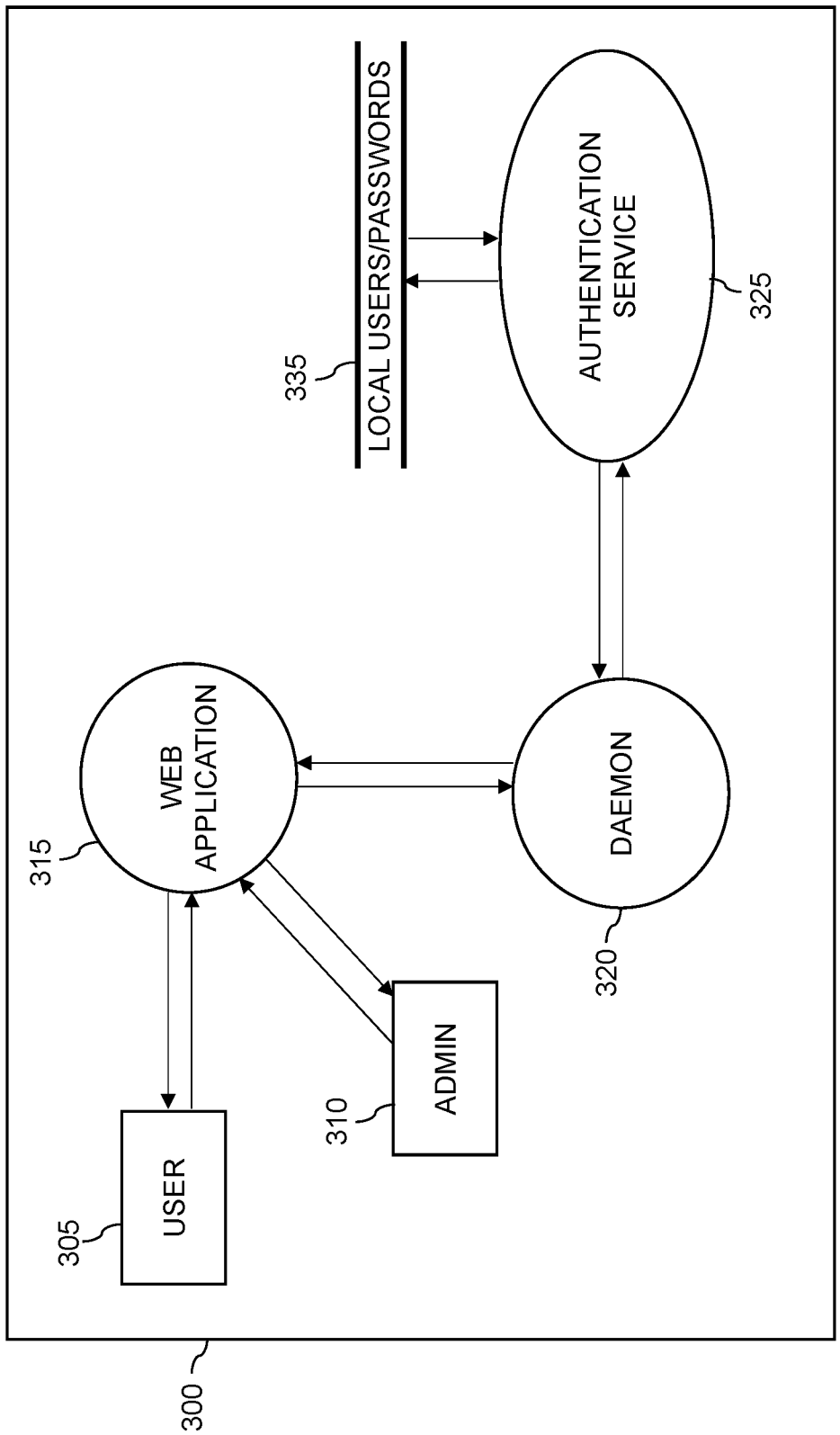
FIG. 3 shows another non-limiting example of input that can be used for filtering security controls in accordance with an illustrative embodiment.

Referring now to FIG. 3, this figure shows another example of input that can be used for filtering security controls in accordance with an illustrative embodiment. In this example, the input is in the form of a design 300 of a system architecture. The design 300 shows various elements of the system architecture including a web application 315, a daemon 320, an AuthN (authentication) service 325, and a data store 335 that stores local user data and passwords. The design 300 also shows a user 305 and an admin 310 that interact with the web application 315. The arrows in the design 300 indicate data flows between the various elements. The design 300 represents, for example, at least a part of input that can be provided to the security controls filtering system 105.

In some example embodiments, if input is provided in the form of a system design (such as, for example, design 300), then security controls may be automatically placed within the system design (such as described in U.S. application Ser. No. 16/530,437, (issued as U.S. Pat. No. 11,206,284 B2 on Dec. 21, 2021), which is incorporated by reference herein in its entirety). Additionally, the security controls within the system design may be dynamically updated to match the level of security required by the user. The amount of effort required to implement the security controls may be estimated (e.g., based on the amount of complexity involved) and output to the user along with, for example, verification methods, and any relevant guidance (e.g., code snippets and libraries).

In this manner, an exemplary embodiment allows an initial set of security protocols that is needed to secure a software design to be output to a user interface, and then this set of security protocols may be dynamically updated in response to a user adjusting the assurance level and/or target market within the user interface. As an example, a set of assurance levels may include:

Compliant Level: A minimum amount of security that a product has to implement to avoid liability.

Standard Practice: A level of security equal to the standard practice in the industry (e.g., a level required by customers to be competitive in the market).

Leading Practice: A level of security that goes beyond customer expectations and provides a superior security experience.

Cutting Edge: A level of security that is more nascent and experimental in nature, going beyond leading practice.

Also, in least some example embodiments, a normalized security control may include information pertaining to, for example, the application criteria, verification information (such as the verification methods needed to achieve a certain assurance level), and references to relevant security standards. For example, a normalized security control for preventing SQL injection vulnerabilities may include the following information:

1) Security Control Description: Any code that interacts with a SQL database must be defensively coded to prevent SQL injection vulnerabilities (for example).
2) Applicability Criteria: any code that interacts with a SQL database.
3) Verification Methods:
    a) Low Assurance: developer attests that parameterized prepared statements (or another safe method) are used throughout the codebase.
    b) Medium Assurance: a static analysis tool verifies that there are no unsafe SQL interactions in the codebase.
    c) Higher Assurance: an independent verification is performed on the software and no SQL injection vulnerabilities are discovered.
4) References: OWASP Top 10 A1, CWE-89 (Part of SANS Top 25, referenced above), PCI Software Security Standard.

Figure 4:
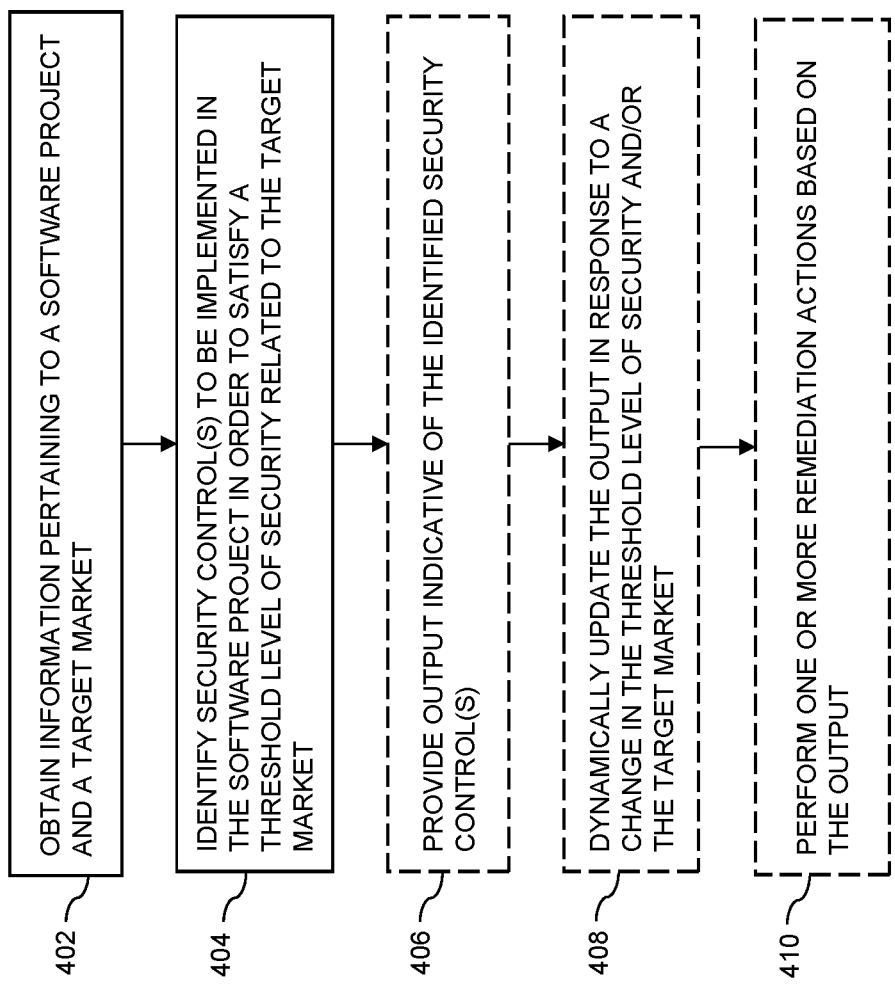
FIG. 4 is a flow diagram of a process for filtering security controls in an illustrative embodiment.

FIG. 4 is a flow diagram of a process for filtering security controls in an illustrative embodiment. It is to be understood that this particular process is only an example, and additional or alternative processes can be carried out in other embodiments.

In this embodiment, the process includes steps 402 through 410, wherein steps 406 through 410, shown in dashed outline, are optional. These steps are assumed to be performed by the processor 120 utilizing its modules 130, 132, and/or 134. Such references herein to optional steps or elements should not be construed as suggesting that other steps or elements are required in other embodiments.

Step 402 includes obtaining information pertaining to a software project and a target market of the software project. Step 404 includes identifying, based on the obtained information, at least one security control to be implemented in the software project, from among a plurality of security controls, in order to satisfy at least a threshold level of security defined for the software project, wherein the threshold level of security is based at least in part on one or more security standards related to the target market. Step 406 includes outputting an indication of the identified security controls. The indication may be output to, for example, a user interface. Step 408 includes dynamically updating the indication in response to a change in the threshold level of security and/or the target market. The change may be, for example, based on user input obtained in response to outputting the indication of the identified security controls. Step 410 includes performing one or more remediation actions based on the output. For example, the one or more remediation actions may include automatically implementing the at least one identified security control in the software project.

The information obtained in step 402 may correspond to user input provided in response to one or more application profiling questions provided on a graphical user interface. The information obtained in step 402 may include a software design representation of the software project that indicates at least one of: one or more processes of the software project, one or more dataflows within the software project, a type of each of the dataflows, one or more existing security controls, and one or more storage data locations. The at least one security control may be mapped to a plurality of security standards to remove overlapping security requirements defined in the plurality of security standards.

The process in FIG. 4 may include a step of maintaining one or more application criteria for each of the plurality of security controls, wherein the application criteria defines software characteristics that trigger a corresponding one of the security controls and a context in which the corresponding security control is required. Identifying the at least one security control in step 402 may be based at least in part on the application criteria that is maintained for each of the plurality of security controls.

The process in FIG. 4 may include a step of maintaining, for a given one of the security controls, a plurality of verification methods, wherein the verification methods verify whether the given security control satisfies different levels of security defined for the software project, and providing information indicative of the identified at least one security control and at least one verification method corresponding to the identified at least one security control that corresponds to the threshold level of security defined for the software project. The threshold level of security may be configurable based on user input. The plurality of verification methods for the given security control may include one or more of: a self-attestation method; an automated static analysis method; and an expert-verification method. The process in FIG. 4 may include estimating a complexity to implement the at least one identified security control, and automatically implementing the at least one identified security control in the software project responsive to the estimated complexity satisfying a threshold complexity level. Step 406 may also include providing guidance information related to the identified security controls (such as, for example, code snippets and/or relevant libraries).

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to filter security controls based on target markets and/or assurance levels. Additionally, some embodiments provide automated means for implementing such security controls in a software project. These and other embodiments can effectively improve the overall security of the system, ensure certain software complies with relevant privacy/security standards, and improve the efficiency of implementing security planning process. Additionally, different security scopes can be modeled to balance time to market versus target security levels considerations. Security analysis paralysis may also be avoided by prioritizing the requirements into assurance levels and by providing a mechanism to filter based on target market. Additionally, some embodiments are configured to provide a security dashboard that is updated over time in order to manage, for example, changes and/or additions to the design of software project (such as, for example, to architectures, suppliers, etc.), changes to security standards, and/or new standards.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
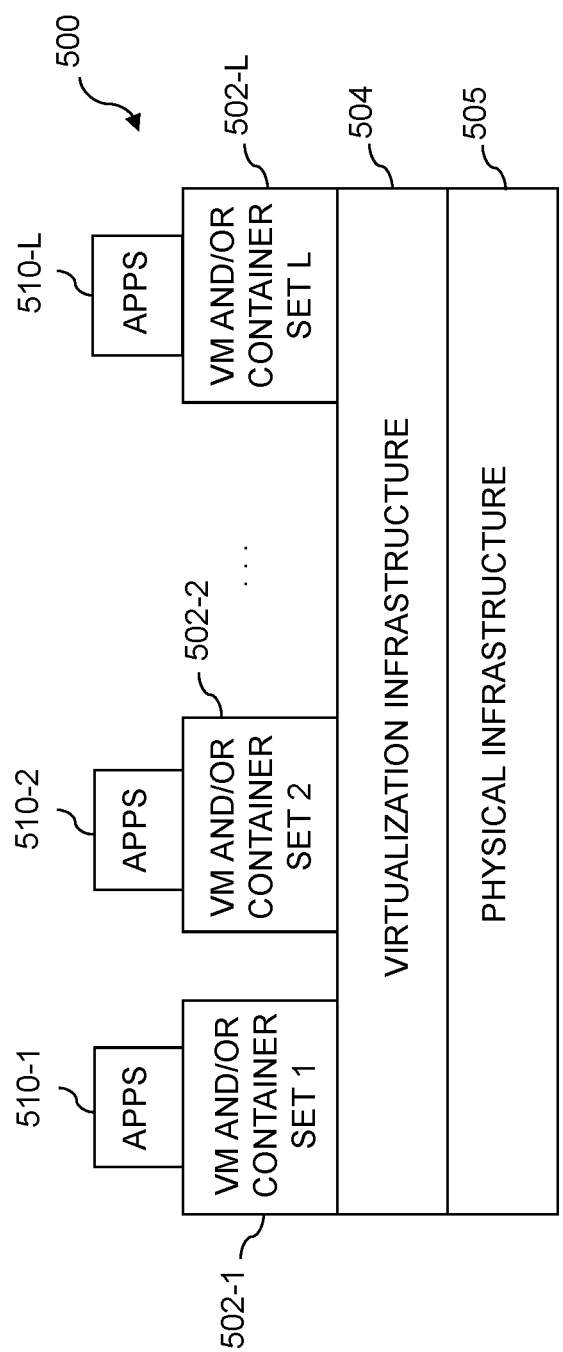
FIGS. 5 and 6 show examples of processing platforms that may be utilized to implement at least a portion of an information processing system in illustrative embodiments.
Figure 6:
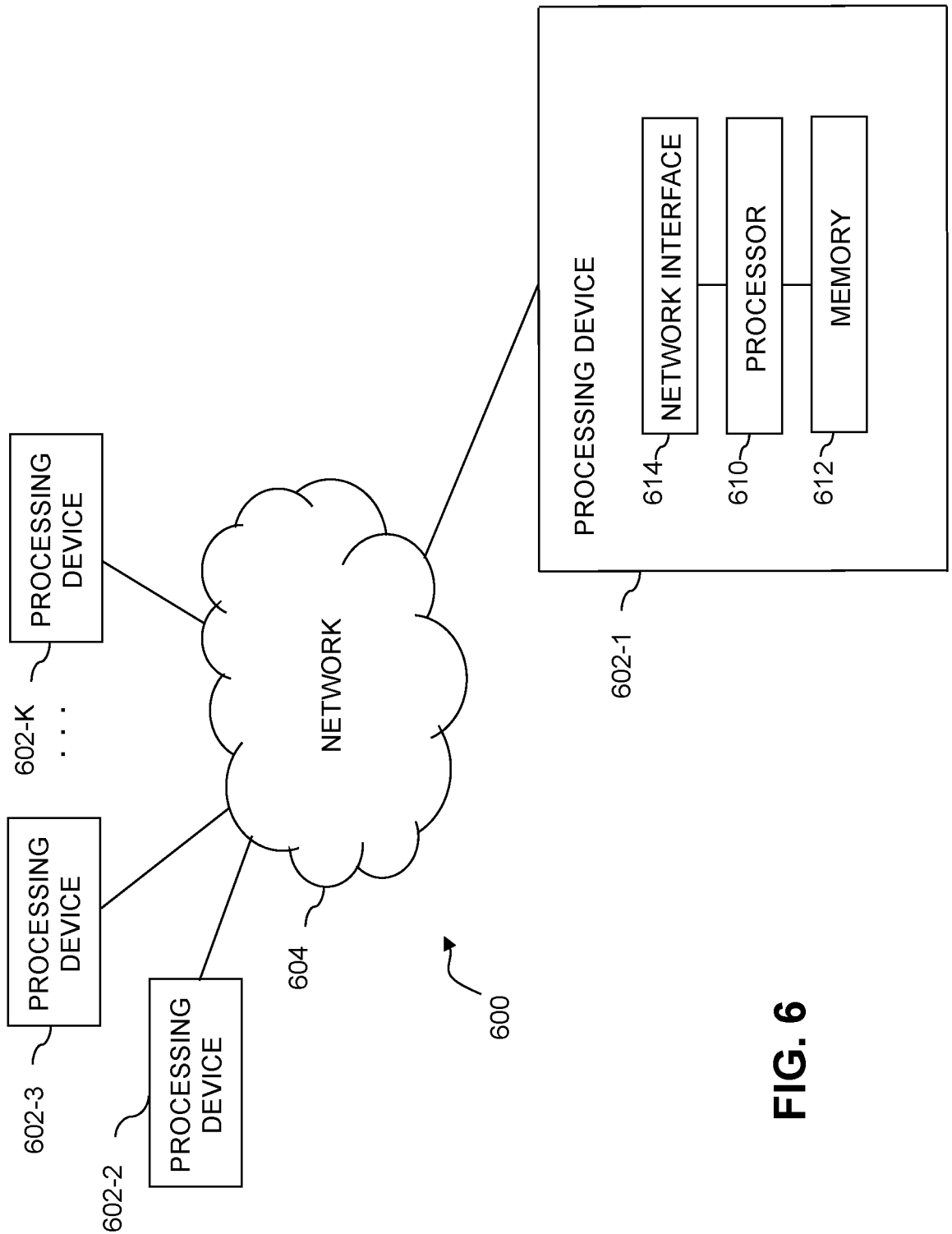

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, a FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

maintaining (a) a database comprising mappings between (i) a plurality of security controls and (ii) security requirements related to a plurality of security standards, and (b) a plurality of verification methods for at least a given one of the security controls, wherein each respective one of the verification methods verifies whether the given security control satisfies a corresponding one of a plurality of security levels, wherein said maintaining is based at least in a part on a software script that evaluates text of the plurality of security standards to identify overlapping sections;

obtaining information pertaining to a software project and a target market of the software project, wherein the information comprises a diagram comprising a plurality of elements of the software project, wherein the plurality of elements comprises: (i) one or more processes, (ii) one or more storage data locations, and (iii) one or more dataflows between at least some of the plurality of elements of the software project;

identifying, based at least in part on the diagram, one or more of the security controls in the database to be implemented in the software project in order to satisfy at least a threshold level of security defined for the software project, wherein the threshold level of security corresponds to one of the plurality of security levels and is based at least in part on one or more of the plurality of security standards related to the target market;

generating a modified diagram of the software project that visually indicates at least one of the identified security controls with respect to at least one of the plurality of elements;

automatically implementing at least one of the identified security controls in the software project; and providing the modified diagram and at least one of a plurality of verification methods maintained in the database for the implemented at least one security control that corresponds to the threshold level of security defined for the software project to verify whether the implemented at least one security control satisfies at least the threshold level security level;

wherein the method is performed by at least one processing device comprising a processor coupled to a memory.

2. The computer-implemented method of claim 1, wherein at least a portion of the obtained information corresponds to user input provided in response to one or more application profiling questions provided on a graphical user interface.

3. The computer-implemented method of claim 1, wherein the plurality of elements of the diagram further comprises at least one of: a type of each of the dataflows, and one or more existing security controls.

4. The computer-implemented method of claim 1, wherein the database maps at least one of the security controls to multiple ones of the security standards to remove overlapping security requirements defined in the plurality of security standards.

5. The computer-implemented method of claim 1, comprising:

maintaining one or more application criteria for each of the plurality of security controls, wherein the application criteria defines software characteristics that trigger a corresponding one of the security controls and a context in which the corresponding security control is required.

6. The computer-implemented method of claim 5, wherein the identifying the one or more security controls is based at least in part on the application criteria maintained for each of the plurality of security controls.

7. The computer-implemented method of claim 1, wherein the threshold level of security is configurable based on user input.

8. The computer-implemented method of claim 1, wherein the plurality of verification methods for the given security control comprises one or more of:
a self-attestation method;
an automated static analysis method; and
an expert-verification method.

9. The computer-implemented method of claim 1, comprising:
obtaining user input specifying a change to one or more of the target market and the threshold level for the software project; and
dynamically updating the identified one or more security controls based on the change.

10. The computer-implemented method of claim 1, comprising:
estimating a complexity to implement the at least one identified security control, wherein the at least one identified security control is automatically implemented in the software project responsive to the estimated complexity satisfying a threshold complexity level.

11. The computer-implemented method of claim 1, wherein said obtaining comprises:
determining the target market of the software project by identifying one or more portions of software code associated with the software project that correspond to one or more of the plurality of security standards.

12. The computer-implemented method of claim 1, further comprising:
determining, for a given one of the identified security controls, relevant information for implementing the given security control within the software project, wherein the relevant information comprises at least one of: an estimated complexity for implementing the given security control, one or more code snippets related to the given security control, and one or more software libraries related to the given security control; and
outputting the relevant information to a graphical user interface.

13. A computer program product comprising a non-transitory processor-readable storage medium having stored therein program code of one or more software programs, wherein the program code when executed by at least one processing device causes the at least one processing device:
to maintain a database comprising (a) mappings between (i) a plurality of security controls and (ii) security requirements related to a plurality of security standards, and (b) a plurality of verification methods for at least a given one of the security controls, wherein each respective one of the verification methods verifies whether the given security control satisfies a corresponding one of a plurality of security levels, wherein said maintaining is based at least in a part on a software script that evaluates text of the plurality of security standards to identify overlapping sections;
to obtain information pertaining to a software project and a target market of the software project, wherein the information comprises a diagram comprising a plurality of elements of the software project, wherein the plurality of elements comprises: (i) one or more processes, (ii) one or more storage data locations, and (iii) one or more dataflows between at least some of the plurality of elements of the software project;
to identify, based at least in part on the diagram, one or more of the security controls in the database to be implemented in the software project in order to satisfy at least a threshold level of security defined for the software project, wherein the threshold level of security corresponds to one of the plurality of security levels and is based at least in part on one or more of the plurality of security standards related to the target market;
to generate a modified diagram of the software project that visually indicates at least one of the identified security controls with respect to at least one of the plurality of elements;
to automatically implement at least one of the identified security controls in the software project; and
to provide the modified diagram and at least one of a plurality of verification methods maintained in the database for the implemented at least one security control that corresponds to the threshold level of security defined for the software project to verify whether the implemented at least one security control satisfies at least the threshold level security level.

14. The computer program product of claim 13, wherein:
at least a portion of the obtained information corresponds to user input provided in response to one or more application profiling questions provided on a graphical user interface.

15. The computer program product of claim 13, wherein the database maps at least one of the security controls to multiple ones of the security standards to remove overlapping security requirements defined in the plurality of security standards.

16. The computer program product of claim 13, wherein the program code when executed by the at least one processing device causes the at least one processing device:
to maintain one or more application criteria for each of the plurality of security controls, wherein the application criteria defines software characteristics that trigger a corresponding one of the security controls and a context in which the corresponding security control is required, wherein the identifying the at least one security control is based at least in part on the application criteria that is maintained for each of the plurality of security controls.

17. The computer program product of claim 13, wherein the plurality of elements of the diagram further comprises at least one of: a type of each of the dataflows, and one or more existing security controls.

18. An apparatus comprising:
at least one processing device comprising a processor coupled to a memory;
the at least one processing device being configured:
to maintain (a) a database comprising: mappings between (i) a plurality of security controls and (ii) security requirements related to a plurality of security standards, and (b) a plurality of verification methods for at least a given one of the security controls, wherein each respective one of the verification methods verifies whether the given security control satisfies a corresponding one of a plurality of security levels, wherein said maintaining is based at least in a part on a software script that evaluates text of the plurality of security standards to identify overlapping sections;

to obtain information pertaining to a software project and a target market of the software project, wherein the information comprises a diagram comprising a plurality of elements of the software project, wherein the plurality of elements comprises: (i) one or more processes, (ii) one or more storage data locations, and (iii) one or more dataflows between at least some of the plurality of elements of the software project;

to identify, based at least in part on the obtained information, one or more of the security controls in the database to be implemented in the software project in order to satisfy at least a threshold level of security defined for the software project, wherein the threshold level of security corresponds to one of the plurality of security levels and is based at least in part on one or more of the plurality of security standards related to the target market;

to generate a modified diagram of the software project that visually indicates at least one of the identified security controls with respect to at least one of the plurality of elements;

to automatically implement at least one of the identified security controls in the software project; and to provide the modified diagram and at least one of a plurality of verification methods maintained in the database for the implemented at least one security control that corresponds to the threshold level of security defined for the software project to verify whether the implemented at least one security control satisfies at least the threshold level security level.

19. The apparatus of claim 18, wherein at least one of: the obtained information corresponds to user input provided in response to one or more application profiling questions provide on a graphical user interface.

20. The apparatus of claim 18, wherein the plurality of elements of the diagram further comprises at least one of: a type of each of the dataflows, and one or more existing security controls.

* * * * *